US012752676B2

(12) United States Patent
Kim

(10) Patent No.: US 12,752,676 B2
(45) Date of Patent: Oct. 6, 2026

(54) DRIVING DEVICE FOR POWER SWIVEL SEAT

(71) Applicant: DAS CO., LTD, Gyeongju-si (KR)

(72) Inventor: Tae Youn Kim, Suwon-si (KR)

(73) Assignee: DAS CO., LTD, Gyeongju-si (KR)

( * ) Notice: Subject to any disclaimer, the term of this patent is extended or adjusted under 35 U.S.C. 154(b) by 91 days.

(21) Appl. No.: 18/989,523

(22) Filed: Dec. 20, 2024

(65) Prior Publication Data

US 2025/0360845 A1 Nov. 27, 2025

(30) Foreign Application Priority Data

May 21, 2024 (KR) ........................ 10-2024-0065522

(51) Int. Cl.
*B60N 2/14* (2006.01)
*B60N 2/02* (2006.01)

(52) U.S. Cl.
CPC ........... *B60N 2/14* (2013.01); *B60N 2/02246* (2023.08); *B60N 2002/022* (2013.01)

(58) Field of Classification Search
CPC ................ B60N 2/14; B60N 2/002246; B60N 2002/022; B60N 2/02253; B60N 2/165; B60N 22/02258; B60N 2/146
See application file for complete search history.

(56) References Cited

U.S. PATENT DOCUMENTS 12,162,383 B2 * 12/2024 Kim .................. B60N 2/02246
12,409,760 B2 * 9/2025 McLaughlin ...... B60N 2/02246
12,491,799 B2 * 12/2025 Kim .................. B60N 2/02246
2022/0324358 A1 * 10/2022 Umezaki .................. B60N 2/16
2023/0286419 A1 9/2023 McLaughlin et al.
2024/0308396 A1 * 9/2024 Kim ......................... B60N 2/14
2026/0021751 A1 * 1/2026 Higuchi ................. B60N 2/146
2026/0103121 A1 * 4/2026 Kim ....................... B60N 2/146

FOREIGN PATENT DOCUMENTS

KR 20140085059 A 7/2014
KR 20230060790 A 5/2023
KR 20230094397 A 6/2023
WO 2021035823 A1 3/2021

OTHER PUBLICATIONS

Korean Office Action for KR application No. 10-2024-0065522, dated Apr. 21, 2025, 7 pages.

* cited by examiner

*Primary Examiner* — David R Dunn
(74) *Attorney, Agent, or Firm* — Renner, Otto, Boisselle & Sklar, LLP; Christopher P Harris

(57) ABSTRACT

A driving device of a power swivel seat includes a housing mounted to a side of a floor panel with a brake ring to coupled thereto, a pinion gear connected to a rotational shaft of a motor, an adapter gear coupled to the pinion gear, a clutch installed to be rotatable on an inside of the brake ring and tooth-engaged with the adapter gear, a brake wedge installed to be rotatable on an inside of the brake ring, a plurality of brake rollers installed between the brake wedge and the brake ring, a cover plate coupled to the housing with the brake ring interposed therebetween, and a spacer disposed between the cover plate and the brake wedge and supporting the brake wedge toward the clutch, and the brake wedge disposed to be movable in a radial direction between the spacer and the clutch, thereby improving the operating sensitivity.

7 Claims, 13 Drawing Sheets

[Figure. 1]
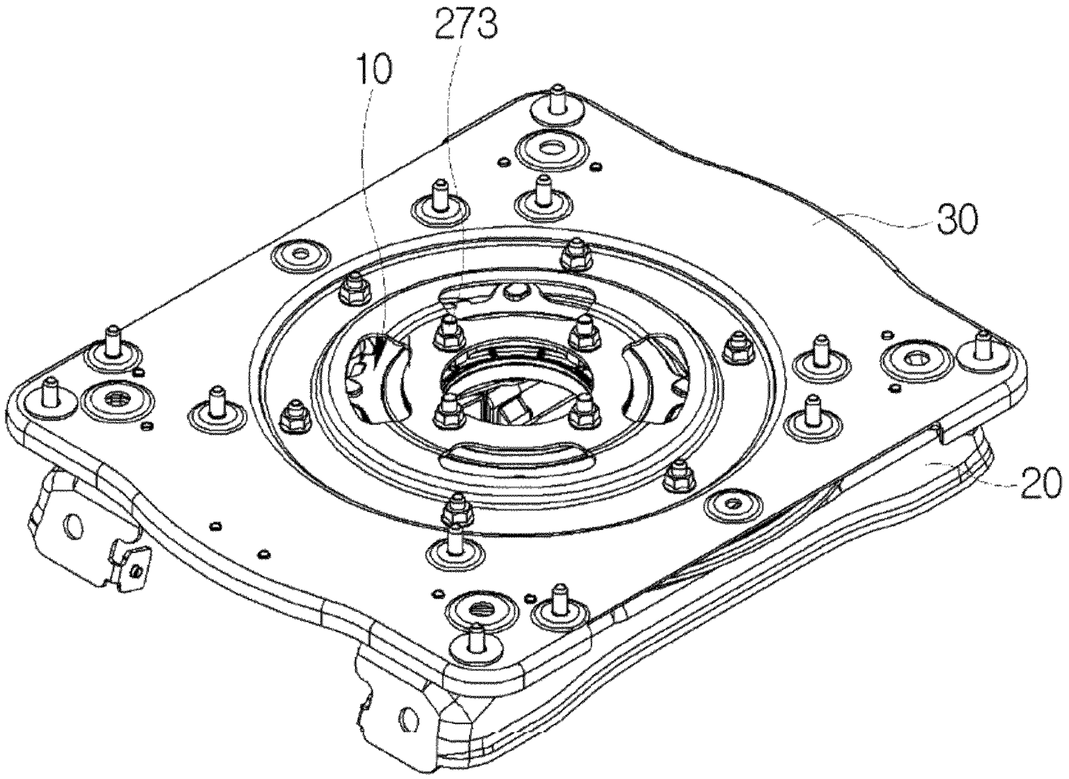

[Figure. 2]
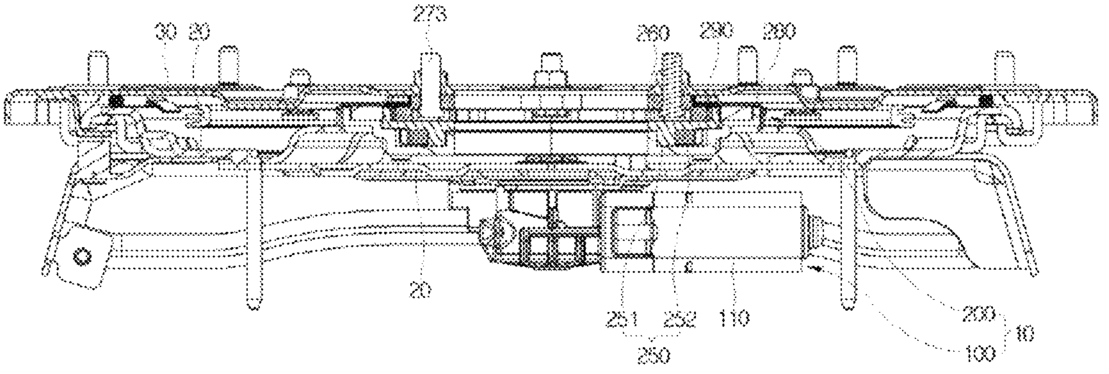

[Figure. 3]
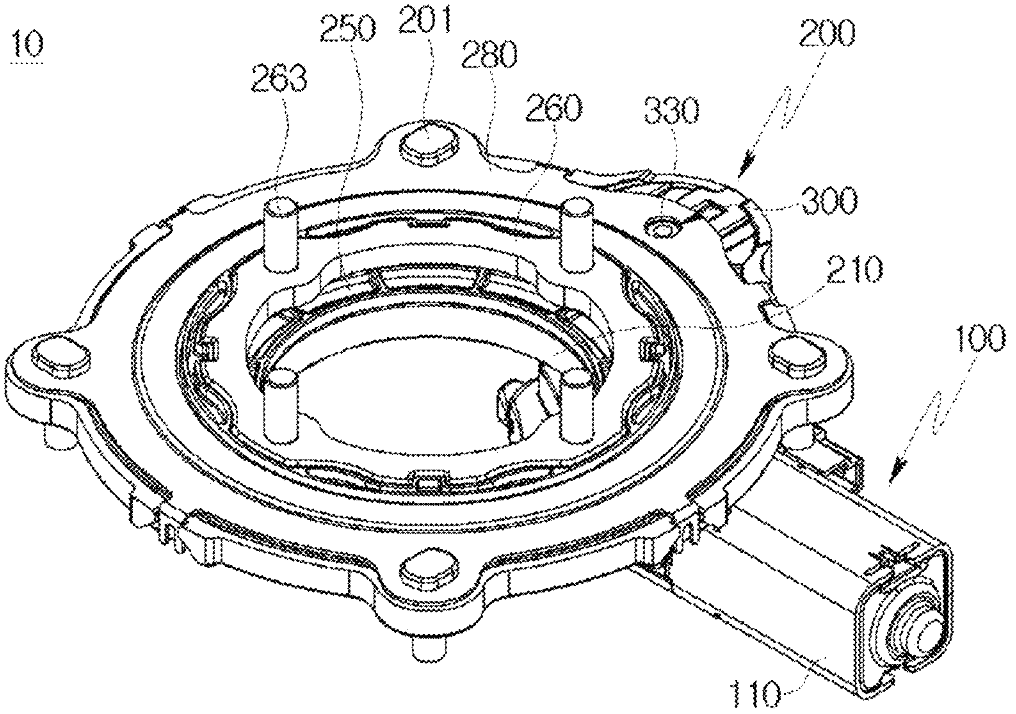

[Figure. 4]
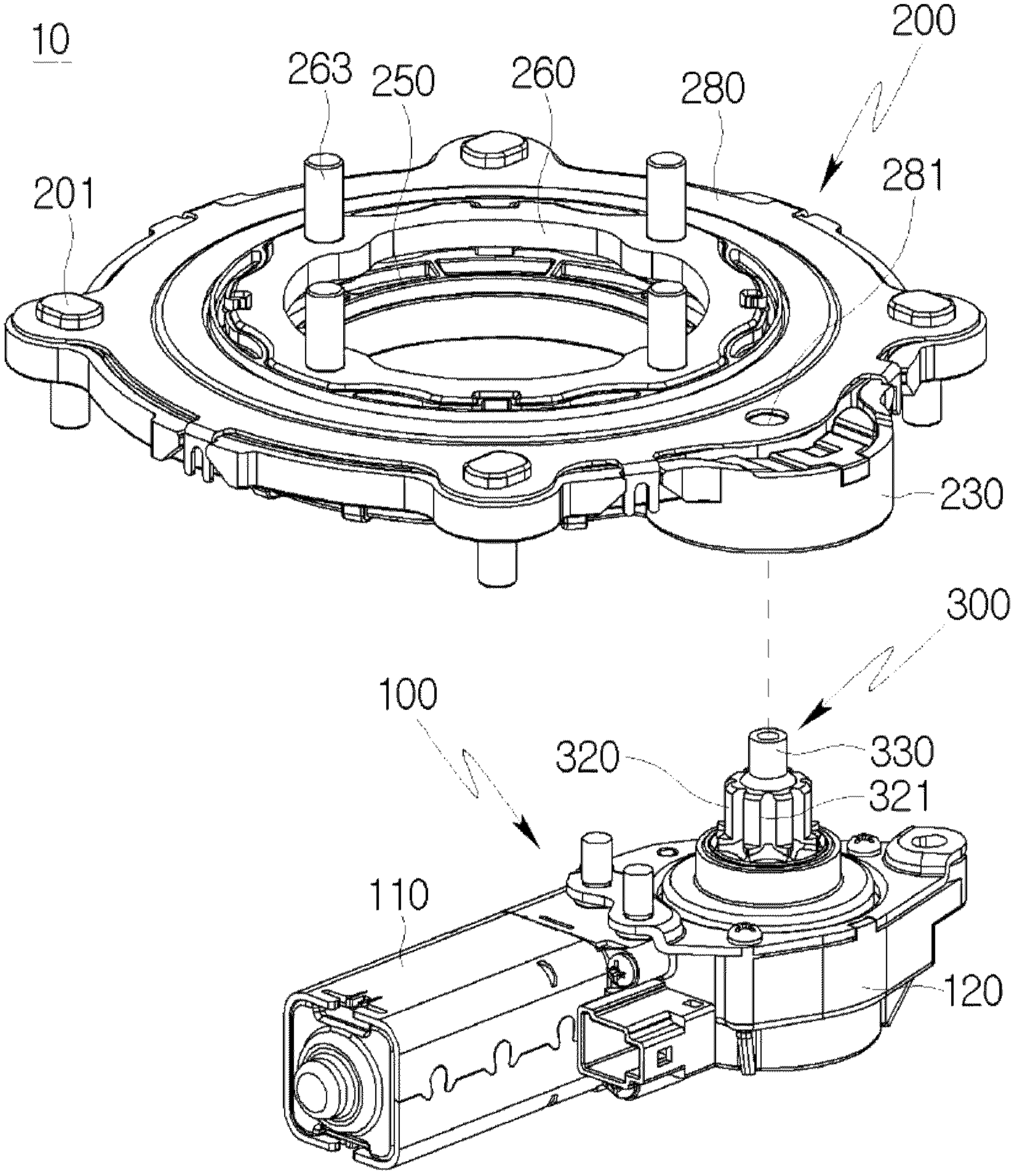

[Figure. 5]
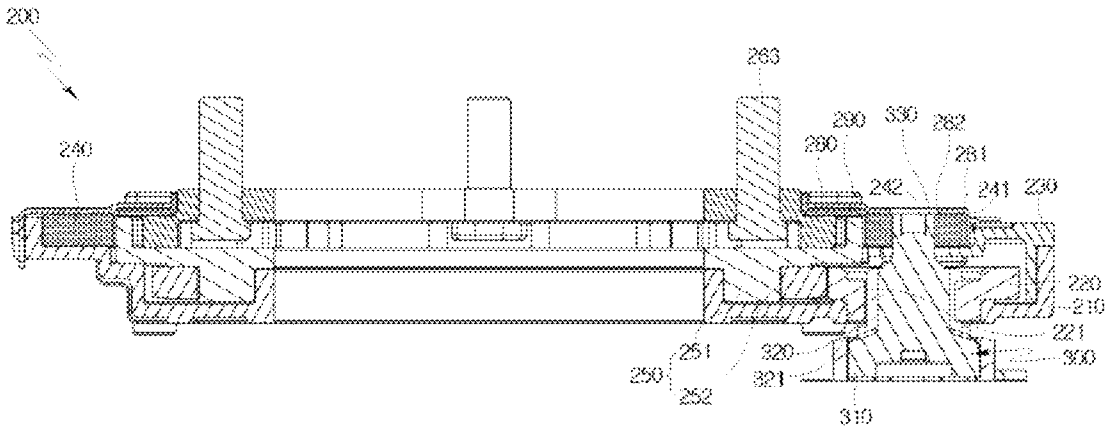

[Figure. 6]
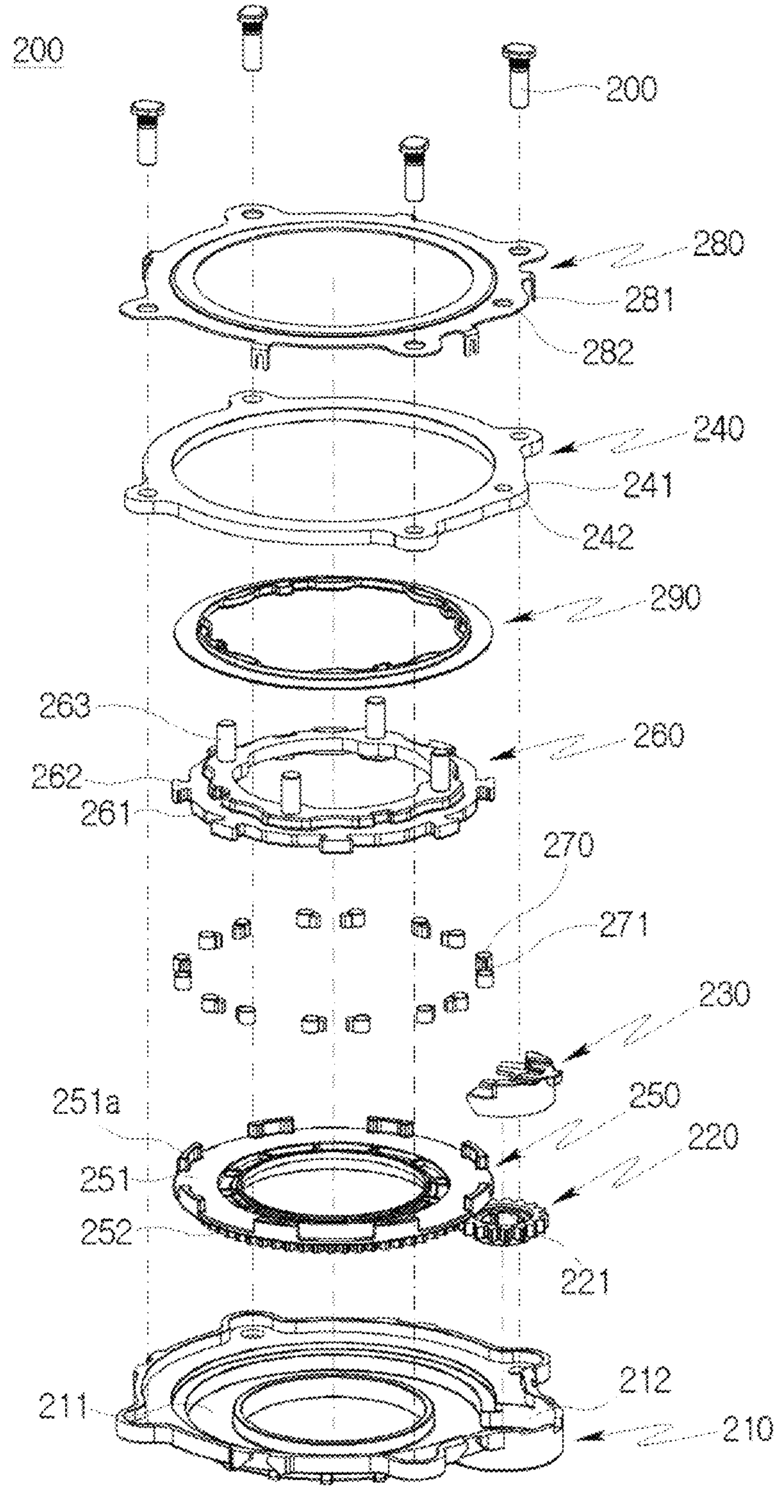

[Figure.7]
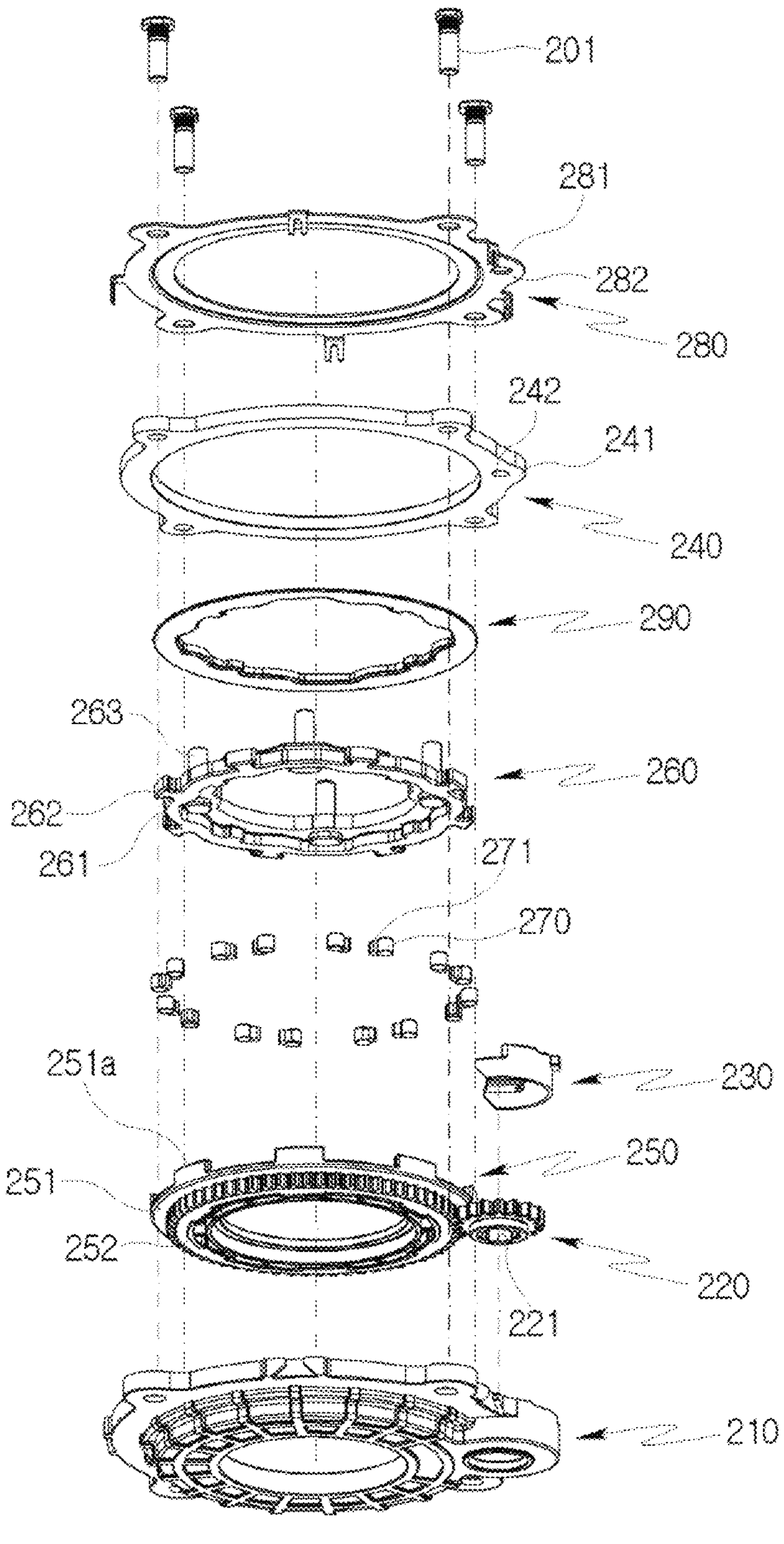

[Figure. 8]
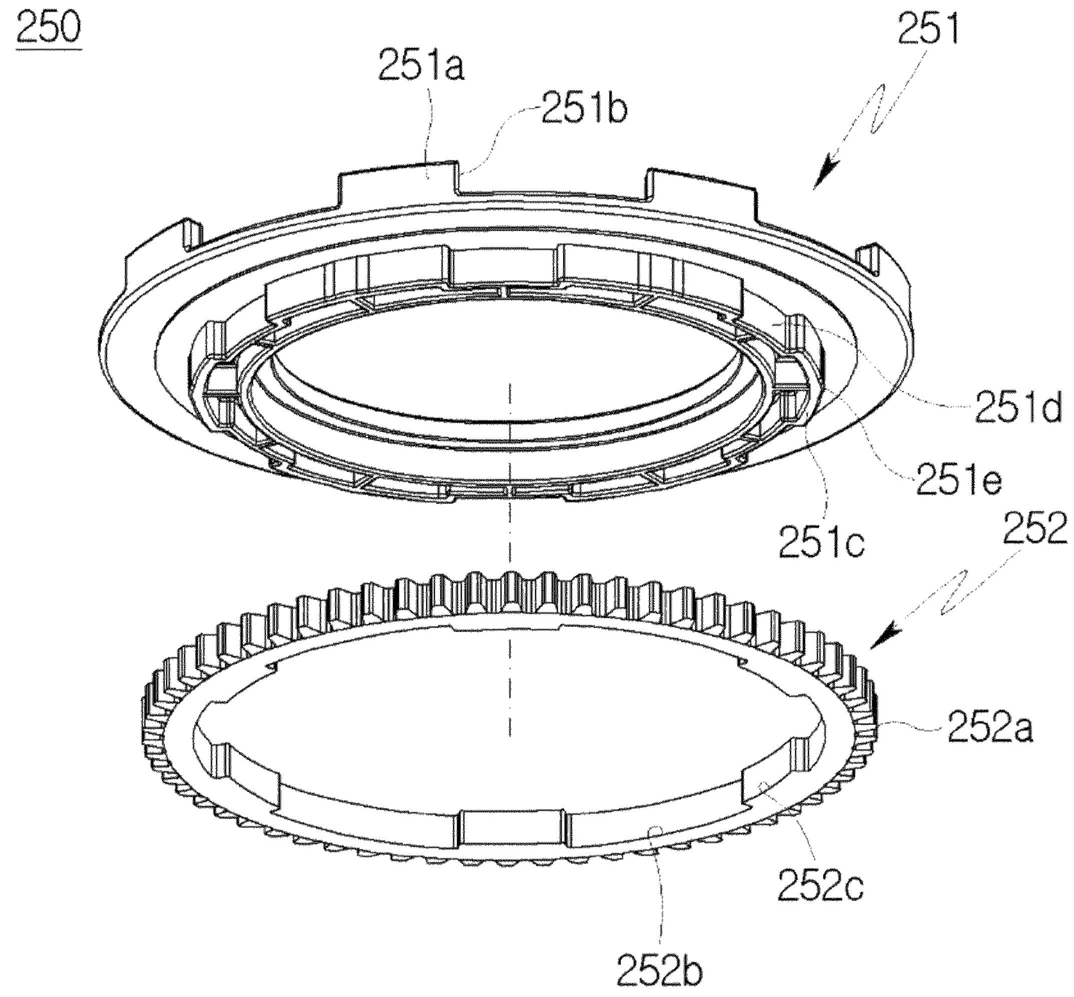

[Figure. 9]
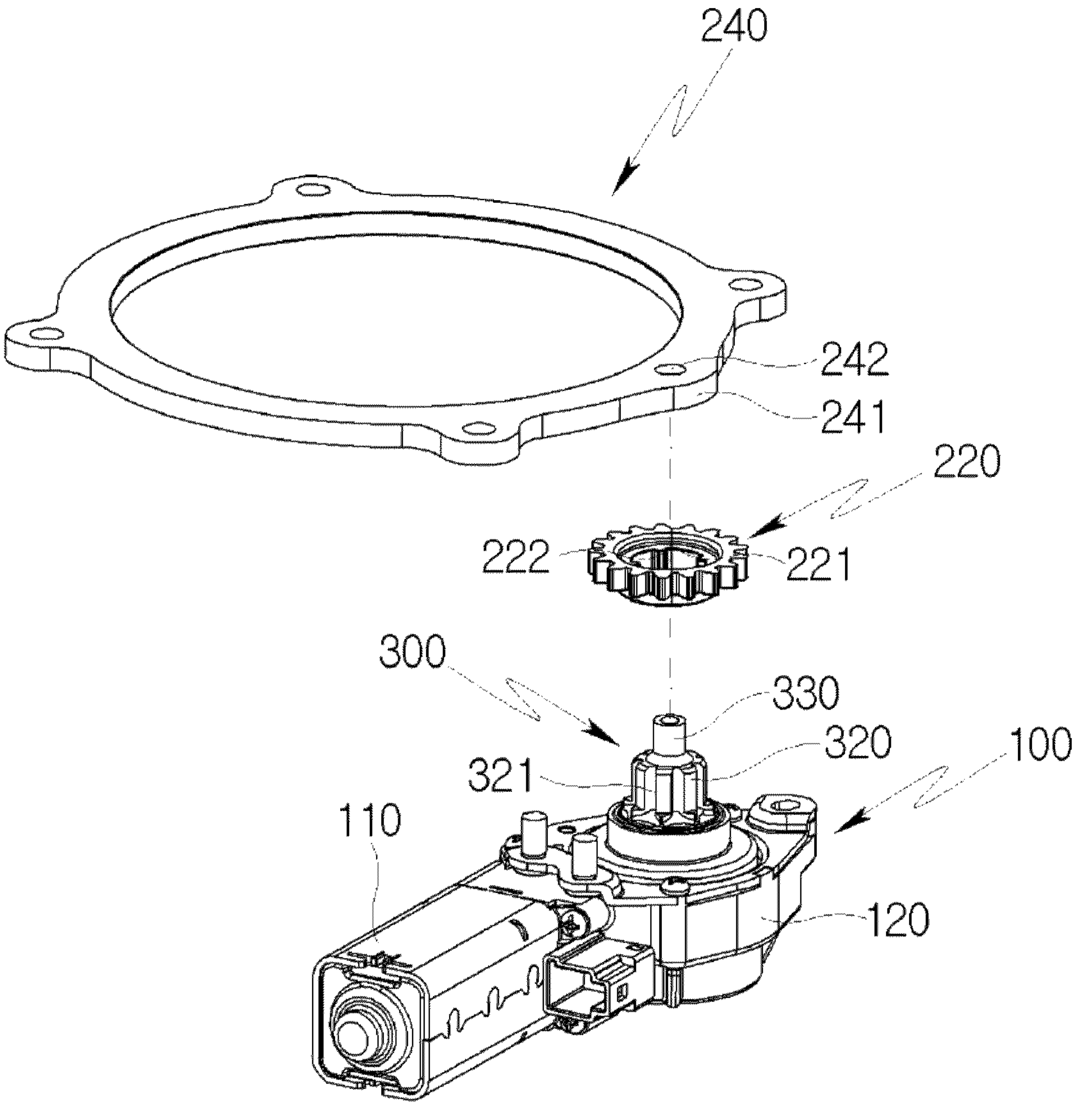

[Figure. 10]
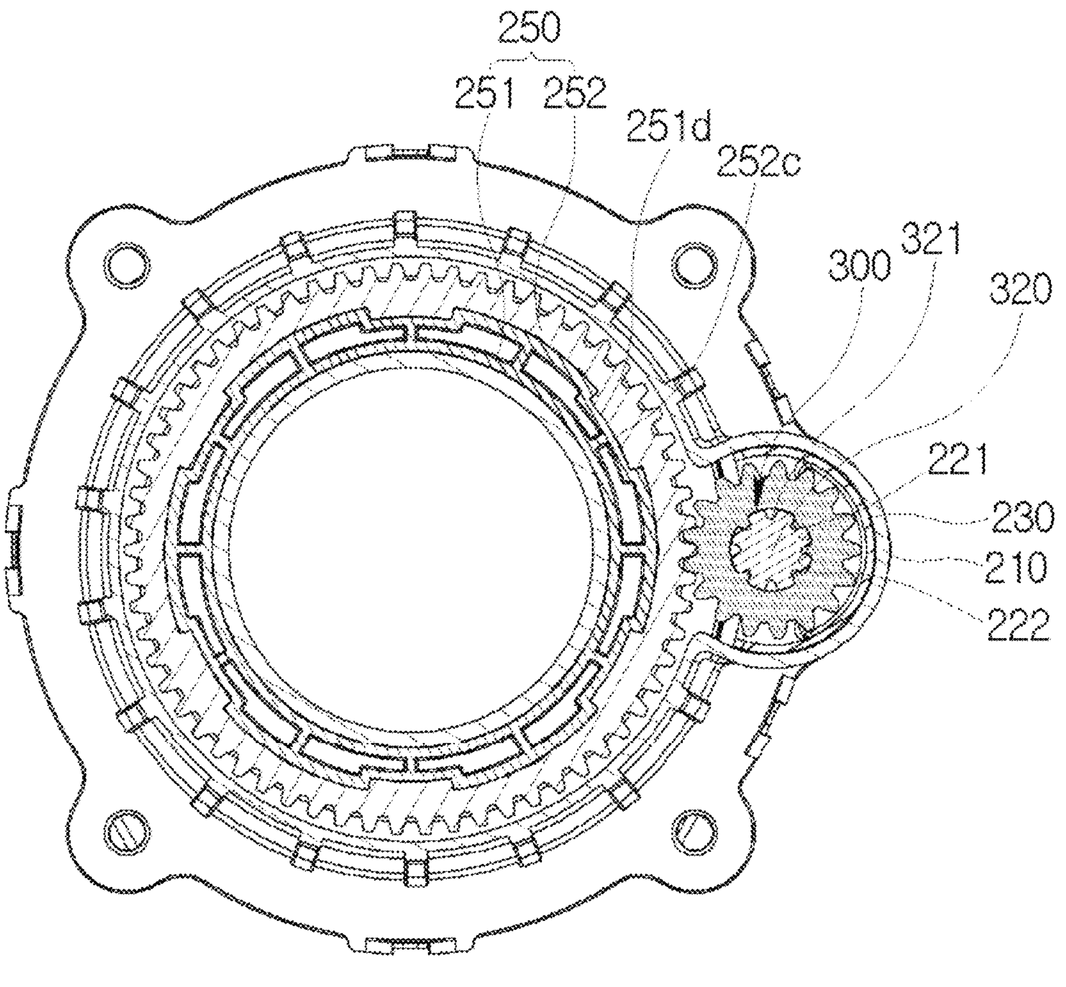

[Figure. 11]
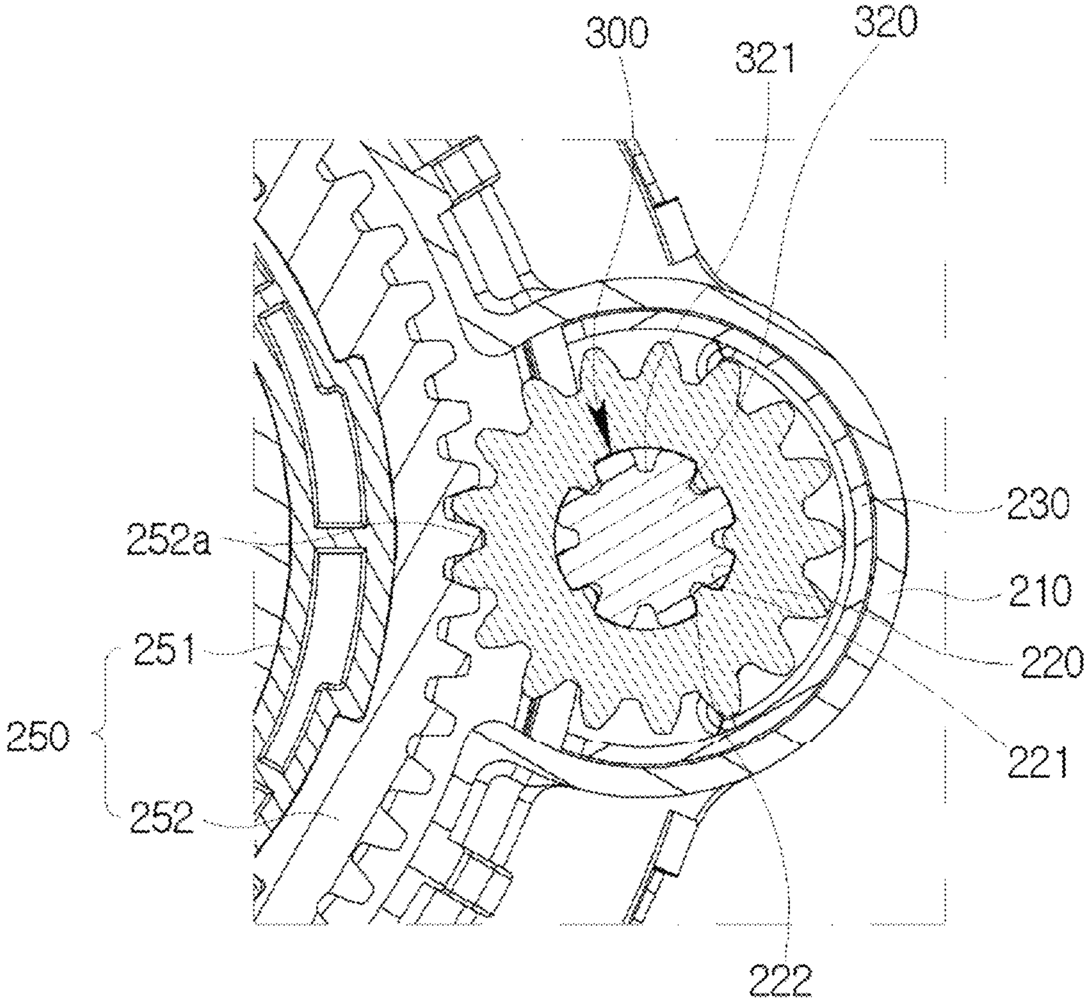

[Figure. 12]
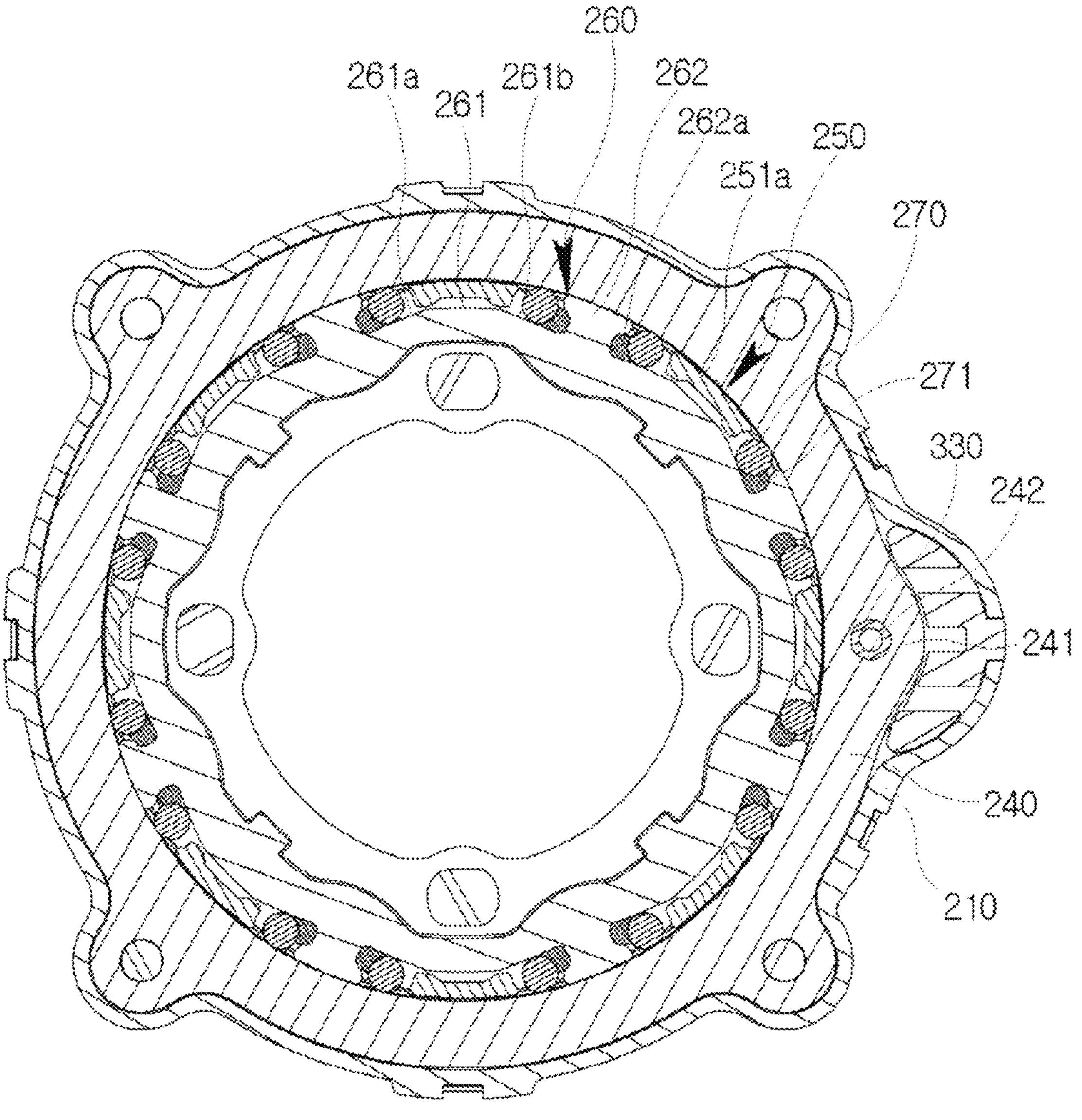

[Figure. 13]
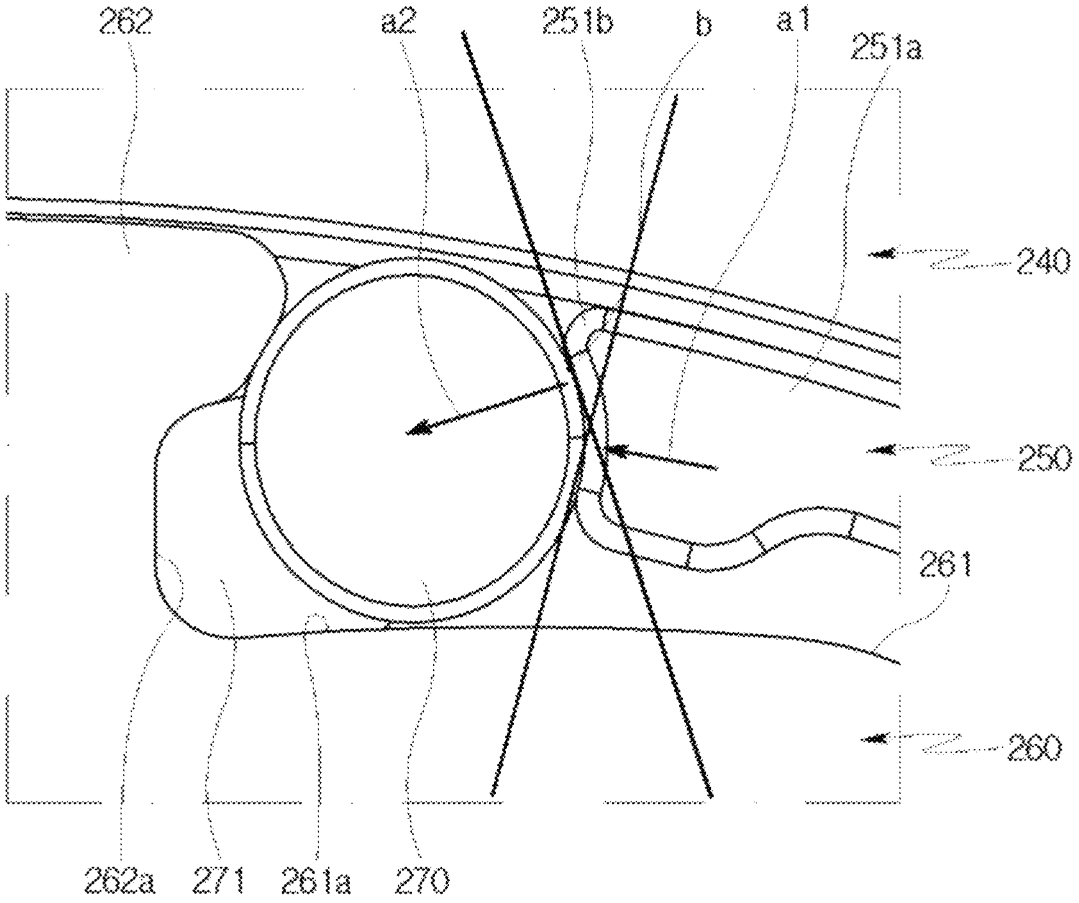

DRIVING DEVICE FOR POWER SWIVEL SEAT

CROSS REFERENCE TO RELATED APPLICATION

The present application claims priority to Korea Patent Application No. 10-2024-0065522, filed May 21, 2024, the entire contents of which is incorporated herein for all purposes by this reference.

FIELD

The present disclosure relates to a driving device of a power swivel seat, more particularly, to a driving device of a power swivel seat which provides a rotational driving force to a swivel seat of a vehicle.

BACKGROUND

A swivel seat refers to a seat configured to be rotatable so that a passenger can turn and sit in a desired direction on an inside of a vehicle. In general, the swivel seat is operated by a driving device having a motor.

The driving device of the swivel seat includes a fixed frame installed and fixed on a floor panel inside a passenger compartment, a rotating frame rotatably installed on an upper side with respect to the fixed frame and mounting a cushion frame of a seat on an upper side thereof, a retainer in a ring shape installed between the fixed frame and the rotating frame and configured to support a rotation relative to each other therebetween to be made possible, a motor installed on the fixed frame, a reduction mechanism installed on a rotational shaft of the motor in interrelation with the motor, a brake wedge and a clutch gear connecting an output side of the reduction mechanism and the rotating frame to each other to be interrelated with each other.

Here, the reduction mechanism may transfer power of the motor to a holder bracket by using a worm wheel coupled to a shaft of a motor, a reduction gear tooth-engaged with the worm wheel, and a gear wheel tooth-engaged with the reduction gear and the clutch gear, respectively, between the reduction gear and the clutch gear, etc.

However, the reduction mechanism of the conventional driving device has a problem in that a quantity of engaged gears are many and a size variation may occur in an assembled portion between gears, and that leads to a frictional noise or vibration.

In addition, size management of the motor and gears of the reduction mechanism is difficult because the motor is provided as one module along with the driving device, and the product quality deteriorates.

Further, as the rotating frame rotates in a state in which the rotating frame is restricted by the fixed frame, in particular, in a state in which a rotational shaft of the rotating frame is fixed, the operational efficiency and the operating sensitivity deteriorate.

Moreover, when an external force is input through the seat, or a great load occurs, the external force and the great load is transferred directly to the motor and the reduction mechanism side, and thus, there is a problem in that the motor and the reduction mechanism may be damaged.

SUMMARY

The present disclosure is conceived so as to solve the above-described problem, and an object thereof is to provide the driving device of the power swivel seat which has the improved operating sensitivity and is operated smoothly because the rotating frame is rotated in a state in which the rotational shaft of the rotating frame is not restricted with respect to the fixed frame.

In addition, an object of the present disclosure is to provide the driving device of the power swivel seat which allows easy management of the size and tolerance and improved assembling efficiency, because the driving module and the rotating module are provided as separate modules which are assembled and installed between the rotating frame and the fixed frame.

In particular, an object of the present disclosure is to provide the driving device of the power swivel seat which allows stable operation of the driving module and reduced noise and vibration, because a structure which guides a position of the driving module is provided on an inside of the rotating module.

Further, an object of the present disclosure is to provide the driving device of the power swivel seat capable of preventing damage of the driving module by preventing transfer of the external force input through the seat or the great load to the driving module.

Moreover, an object of the present disclosure is to provide the driving device of the power swivel seat capable of improving strength of the tooth-engagement and reducing collision noise between the brake roller and the brake wedge because the clutch is configured through press-fit coupling between a gear part and an unlocking part.

One embodiment is a driving device of a power swivel seat, including: a housing mounted to a side of a floor panel and allowing a brake ring to be coupled thereto; a pinion gear connected to a rotational shaft of a motor and configured to receive a rotational force when the motor operates; an adapter gear coupled to the pinion gear and configured to rotate together with the pinion gear; a clutch installed to be rotatable on an inside of the brake ring and tooth-engaged with the adapter gear; a brake wedge installed to be rotatable on an inside of the brake ring and configured to be rotated by the clutch; a plurality of brake rollers installed between the brake wedge and the brake ring and configured to restrict or release a rotation of the brake wedge with respect to the brake ring; a cover plate coupled to the housing with the brake ring interposed therebetween; and a spacer disposed between the cover plate and the brake wedge and supporting the brake wedge toward the clutch, and the brake wedge may be disposed to be movable in a radial direction between the spacer and the clutch.

The driving device may further include: a fixed frame fixed to the housing and the floor panel; and a rotating frame fixed to the brake wedge and the seat, and the rotating frame may be rotatably installed on the fixed frame such that a rotational shaft of the rotating frame is movable.

The brake ring may have a pinion guide hole formed to allow an end of the pinion gear to be inserted thereinto.

The cover plate may have a complementary guide hole formed to correspond to the pinion guide hole.

The clutch may have at least one unlock protrusion protruding from one surface and configured to press the brake roller in a circumferential direction, and the unlock protrusion may have a protruding portion protruding from a surface pressing the brake roller and configured to press the brake roller in a circumferential direction toward a radial inside.

Another embodiment is a driving device of a power swivel seat, including: a driving module including a motor; and a rotating module installed between a floor panel and a seat, and the rotating module may include: a housing a housing mounted on a side of a floor panel and allowing a brake ring to be coupled thereto; a clutch installed to be rotatable on an inside of the brake ring; an adapter gear configured to be rotated by the driving module and tooth-engaged with the clutch to rotate the clutch; a brake wedge installed to be rotatable on an inside of the brake ring and configured to be rotated by the clutch; and a plurality of brake rollers installed between the brake wedge and the brake ring and configured to restrict or release a rotation of the brake wedge with respect to the brake ring, and the driving module may include: a pinion gear connected to a rotational shaft of a motor and configured to receive a rotational force when the motor rotates and to transfer a rotational force to the rotating module, and the pinion gear may be fixed to the adapter gear and at least a portion thereof is inserted into a pinion guide hole formed on the brake ring.

The adapter gear may have an insertion hole allowing the pinion gear to be inserted thereinto, and the pinion gear may include: an adapter portion inserted into the insertion hole and having a plurality of adapter grooves spaced apart from each other at an equal interval on an outer circumferential surface along a circumferential direction, and the adapter gear may further include: an adapter protrusion protruding from an inner circumferential surface of the insertion hole and formed to be inserted to one among the plurality of adapter grooves.

The pinion gear may include: a pinon body fixed to the driving module; an adapter portion penetrating the housing and fastened to the adapter gear; and a pinion end inserted into the pinion guide hole.

The driving device may further include a cover plate coupled to the housing with the brake ring interposed therebetween, and the cover plate may have a complementary guide hole formed to correspond to the pinion guide hole.

According to the driving device of the power swivel seat according to the present disclosure, there are one or more effects as below.

First, according to the present disclosure, as described above, there is an effect that the operating sensitivity is improved and the driving device is smoothly operated, because the rotating frame is rotated in a state in which the rotational shaft thereof is not restricted.

In addition, management of size and tolerance is easy and assembling efficiency is improved because the driving module and the rotating module are provided as separate modules which are assembled and installed between the rotating frame and the fixed frame.

In particular, there is an effect that the driving module is stably operated and noise and vibration is reduced because a structure which guides a position of the driving module is provided on an inside of the rotating module.

Further, there is an effect that damage of the driving module can be prevented by preventing transfer of the external force input through the seat or the great load to the driving module.

Moreover, there is an effect that strength of the tooth-engagement is improved and collision noise between the brake roller and the brake wedge is reduced because the clutch is configured through press-fit and coupling between a gear part and an unlocking part.

BRIEF DESCRIPTION OF THE DRAWINGS

FIG. 1 is a perspective view of a driving device of a power swivel seat according to an embodiment of the present disclosure.

FIG. 2 is a cross-sectional view of FIG. 1.

FIG. 3 is a state in which a fixed frame and a rotating frame of FIG. 1 are removed.

FIG. 4 is an exploded perspective view of FIG. 3.

FIG. 5 is a cross-sectional view of a rotating module of a driving device of a power swivel seat according to an embodiment of the present disclosure.

FIGS. 6 and 7 are exploded perspective views of a rotating module of a driving device of a power swivel seat according to an embodiment of the present disclosure.

FIG. 8 is an exploded perspective view of a clutch of a driving device of a power swivel seat according to an embodiment of the present disclosure.

FIG. 9 is an exploded perspective view of a brake ring, an adapter gear, a pinion gear, and a driving module of a driving device of a power swivel seat according to an embodiment of the present disclosure.

FIG. 10 is a cross-sectional view for describing a coupling state of an adapter gear and a pinion gear of a driving device of a power swivel seat according to an embodiment of the present disclosure.

FIG. 11 is an enlarged view of a coupled portion of an adapter gear and a pinion gear in FIG. 10.

FIG. 12 is a cross-sectional view for describing an operation structure of a clutch, a brake wedge, and a brake roller of a driving device of a power swivel seat according to an embodiment of the present disclosure.

FIG. 13 is an enlarged view for describing a case in which a brake wedge in FIG. 12 rotates.

DETAILED DESCRIPTION

Hereinafter, exemplary embodiments will be fully described with reference to the accompanying drawings.

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

It will be understood that when the terms "first" and "second" are used herein to describe various components, these components should not be limited by these terms. The above terms are used only to distinguish one component from another. For example, a first component may be referred to as a second component and vice versa without departing from the scope of the present disclosure.

The term "and/or" includes any and all combinations of one or more of the associated listed items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

The terminology used herein is for the purpose of describing particular embodiments only and is not intended to be limiting of the present disclosure. As used herein, the singular forms are intended to include the plural forms as well, unless the context clearly indicates otherwise.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the following exemplary embodiments of the present disclosure are provided to those skilled in the art in order to describe the present disclosure more completely. Accordingly, shapes and sizes of elements shown in the drawings may be exaggerated for clarity.

FIG. 1 is a perspective view of a driving device of a power swivel seat according to an embodiment of the present disclosure, FIG. 2 is a cross-sectional view of FIG. 1, FIG. 3 is a state in which a fixed frame and a rotating frame of FIG. 1 are removed, FIG. 4 is an exploded perspective view of FIG. 3, FIG. 5 is a cross-sectional view of a rotating module of a driving device of a power swivel seat according to an embodiment of the present disclosure, FIGS. 6 and 7 are exploded perspective views of a rotating module of a driving device of a power swivel seat according to an embodiment of the present disclosure, FIG. 8 is an exploded perspective view of a clutch of a driving device of a power swivel seat according to an embodiment of the present disclosure, FIG. 9 is an exploded perspective view of a brake ring, an adapter gear, a pinion gear, and a driving module of a driving device of a power swivel seat according to an embodiment of the present disclosure, FIG. 10 is a cross-sectional view for describing a coupling state of an adapter gear and a pinion gear of a driving device of a power swivel seat according to an embodiment of the present disclosure, FIG. 11 is an enlarged view of a coupled portion of an adapter gear and a pinion gear in FIG. 10, FIG. 12 is a cross-sectional view for describing an operation structure of a clutch, a brake wedge, and a brake roller of a driving device of a power swivel seat according to an embodiment of the present disclosure, and FIG. 13 is an enlarged view for describing a case in which a brake wedge in FIG. 12 rotates.

As illustrated in FIGS. 1 and 2, a driving device 10 of the power swivel seat according to the present disclosure is disposed between a fixed frame 20 and a rotating frame 30, and rotates the seat when the driving device 10 operates.

The fixed frame 20, for example, may be mounted on a floor panel (not illustrated) of a vehicle, or may be part of the floor panel. Such a fixed frame 20 is fixed to the vehicle and may be coupled to a housing 210 to be described below.

The rotating frame 30 may be, for example, a frame which is mounted to a seat (not illustrated) or which configures the seat. Such a rotating frame 30 is provided to rotate with respect to the fixed frame 20 when the driving device 10 operates, and may be coupled to a brake wedge 260 to be described below.

In addition, as illustrated in FIGS. 3 and 4, the driving device of the power swivel seat according to the present disclosure is configured with a driving module 100, a rotating module 200, and a pinion gear 300, and each of the rotating module 200 and the driving module 100 is assembled and provided in a module form. The pinion gear 300 may be provided as a separate part or provided in a state of being assembled into the driving module 100.

That is, a motor 110 and the pinion gear 300 are included in the driving module 100, are provided as separate modules and assembled into the rotating module 200, thereby the tolerance management and assembly is easy.

The rotating module 200 is provided with a driving force from the driving module 100, and may include parts for supporting a rotation of the fixed frame 20 and the rotating frame 30. In more detail, the rotating module 200 may include an adapter gear 220 to which the driving module 100 is connected. In addition, the rotating module 200 may further include the housing 210, a wheel cover 230, a brake ring 240, a clutch 250 with which the adapter gear 220 is engaged, the brake wedge 260, a brake roller 270, and a cover plate 280.

At least part of the driving module 100 is coupled to a fixed part of the rotating module 200 or the fixed frame 20, and at the same time, the pinion gear 300 provided in the driving module 100 is connected to a rotating part of the rotating module 200.

For example, when at least part of the driving module is coupled to the rotating module 200 or the fixed frame 20 side, the pinion gear 300 is connected to the adapter gear 220. At this instance, when the pinion gear 300 is connected to the adapter gear 220, a rotational shaft of the pinion gear 300 becomes coaxial with a rotational shaft of the adapter gear 200, and when the pinion gear 300 rotates, the adapter gear 200 may be rotated theretogether.

In addition, the pinion gear 300 is inserted into at least one among a pinion guide hole 242 and a supplementary guide hole 282 formed in the brake ring to be described below, and a position thereof may be aligned in the rotating module 200. In addition, a pinion guide portion 241 and a supplementary guide portion 281 prevent shaking when the pinion gear 300 rotates so that interference and friction between gears can be prevented and noise and vibration can be minimized. The pinion gear 300 will be described in more detail below.

The driving module 100 may include the motor 100, a gear housing 120, and the pinion gear 300.

The motor 100 is operated by receiving electricity from a battery of a vehicle, and as a passenger controls a switch provided in the seat, the motor 100 may be turned on and off and a rotational direction thereof may be adjusted.

The motor 110 generates a rotational force by receiving power, and a rotational force of the motor 110 may be output through the pinion gear 300. That is, a rotational shaft (not illustrated) of the motor 110 is connected to the pinion gear 300, and when the motor 110 operates, the pinion gear 300 rotates to output the rotational force.

The gear housing 120 allows the motor 110 to be mounted thereon and at least part of the motor 110 and the gear (not illustrated) to be accommodated therein.

At least part of the pinion gear 300 is disposed inside the gear housing 120, and another part thereof is disposed to protrude outward of the gear housing 120 and is connected to the rotating module 200.

A reduction mechanism may be provided inside the gear housing 120 so as to improve the output of the motor 110.

In addition, the rotational shaft of the pinion gear 300 may be disposed to be in parallel with a rotational shaft of the rotating module 200, and may move along the rotational shaft of the rotating module 200 to be connected to the rotating module 200.

Meanwhile, the pinion gear 300 may include a pinion body 310, an adapter portion 320, and a pinion end 330, and receive the rotational force of the motor 110.

Referring to FIG. 9, the pinion body 310 may be fixed to the driving module 100, in more detail, the pinion body 310 may be fixed to the adapter gear 220 and may rotate together with the adapter gear 220. The pinion body 310 may be disposed coaxially with a rotational shaft of the adapter gear 220, and have a groove into which at least part of the pinion gear is inserted and fixed. In addition, the pinion body 310 is inserted into an inside of the gear housing 120, and is fixed to the adapter gear 220. In addition, the pinion body 310 is disposed below the adapter gear 220, and the adapter portion 320 may be disposed on the pinion body 310.

The adapter portion 320 is provided to be connected to a rotating part of the rotating module 200. In more detail, the adapter portion 320 is inserted into an insertion hole 221 of the adapter gear 220 to be described below. The adapter portion 320 is formed in a cylindrical shape and the rotational shaft thereof may be disposed coaxially with the rotational shaft of the pinion gear 300 and the adapter gear 220.

In addition, the adapter portion 320 may have a plurality of adapter grooves 321, each of which is part of an outer circumferential surface of the adapter portion 320 recessed, and the plurality of adapter grooves 321 may be provided to be spaced apart from each other at an equal interval along a circumferential direction.

An adapter protrusion 222 provided in the insertion hole 221 of the adapter gear 220 is inserted into at least part of the plurality of adapter grooves 321. In addition, the adapter groove 321 is formed to be open upward and downward, and the adapter protrusion 222 is inserted into the adapter groove 321 through a lower opening thereof to be engaged with the adapter groove 321.

The pinion gear 300 may have the pinion end 330 on an upper side of the adapter portion 320. The pinion end 330 is inserted into the pinion guide hole 242 formed in the brake ring 240 and is supported thereon. With this configuration, when the pinion gear 300 rotates, a shaft of the pinion gear 300 is aligned and the pinion gear 300 rotates without shaking, and generation of interference between the adapter gear 220 and the clutch 250 can be prevented.

In addition, the pinion end 330 may pass through the pinion guide hole 242, and may be inserted into a complementary guide hole 282 formed in the cover plate 280.

When the pinion body 310 of the pinion gear 300 is fixed to the driving module 100, and the driving module 100 is connected to the rotating module 200, the pinion gear 300 passes through a pinion through-hole 213 of the housing 210, the adapter portion 320 is disposed inside the adapter gear 220, and the pinion end 330 passes through the wheel cover 230 and is inserted into the pinion guide hole 242. In addition, the pinion end 330 may be inserted into the complementary guide hole 282.

Meanwhile, referring to FIGS. 5 to 7, the housing 210, the adapter gear 220, the wheel cover 230, the brake ring 240, the clutch 250, the brake wedge 260, the brake roller 270, and the cover plate 280 of the rotating module 200 will be described.

The housing 210 may be formed in a shape capable of accommodating at least part of the clutch 250 and the adapter gear 220 therein. In more detail, a portion in which the adapter gear 220 of the housing 210 is accommodated is coupled to the wheel cover 230, and the adapter gear 220 may be rotatably accommodated in a space between the housing 210 and the wheel cover 230.

That is, a clutch accommodating portion 211 is provided in the housing 210 and at least part of the clutch 250 is disposed therein, and a gear wheel accommodating portion 212 is provided in the housing 210 and an adapter gear 220 is disposed in the gear wheel accommodating portion 212, and the wheel cover 230 may be coupled to the housing 210.

The clutch accommodating portion 211 provides a circular hollow space so that a gear part 252 of the clutch 250 can be disposed therein, and a through-hole may be formed at the center thereof.

The gear wheel accommodating portion 212 provides a space having a circular cylindrical shape and accommodating the adapter gear 220 therein, a pinion through hole 213 through which the pinion gear 300 can pass is formed at the center thereof, and the wheel cover 230 is coupled to the gear wheel accommodating portion 212 so that the adapter gear 220 disposed inside can be supported. At this instance, a slit allowing the pinion end 330 of the pinion gear 300 to be described below to pass therethrough may be provided in the wheel cover 230.

The housing 210 may be formed in a shape capable of accommodating the clutch 250, the brake wedge 260, and the brake roller 270 therein. The clutch 250, the brake wedge 260, and the brake roller 270 may be rotatably disposed inside the housing 210.

The housing 210 is formed in a shape of which one axial side (upper side) is open, a flange protrudes outward in a radial direction from an outer circumferential surface of the open side, and a plurality of holes are formed in the flange so as to allow a fastening member 201 to be fastened thereto.

The brake ring 240, and the cover plate 280 may be coupled to the housing 210. In more detail, the housing 210 may be fixedly coupled to the brake ring 240 and the cover plate 280 through the fastening member 201 such as a piece and the like. In addition, a hook is formed in the flange of the housing 210, and the hook may be coupled to the cover plate 280. A space formed because of coupling between the housing 210, the brake ring 240, and the cover plate 280 may accommodate the adapter gear 220, the wheel cover 230, the clutch 250, the brake wedge 260, and the brake roller 270 therein.

The adapter gear 220 may transfer the rotational force of the motor 110 to the clutch 250. The adapter gear 220 may be engaged with the clutch 250. At this instance, because the adapter gear 220 is engaged only with the clutch 250, the assembly variation between the adapter gear 220 and the clutch 250 can be reduced, and the size can be managed easily.

The adapter gear 220 is formed in a circular block shape having a certain thickness, and gear-tooth may be formed on an outer circumferential surface.

The adapter gear 220 is connected to the pinion gear 300 and may rotate together with the pinion gear 300 by receiving the rotational force of the motor 110.

The adapter gear 220 has a shape to be coupled to the pinion gear 300 of the motor 110. In more detail, the adapter gear 220 has the insertion hole 221 into which the pinion gear 300 is inserted and coupled, at its center.

In addition, the adapter gear 220 has at least one adapter protrusion 222 in the insertion hole 221 so that the pinion gear 300 can be coupled thereto.

With this configuration, the pinion gear 300 of the motor 110 is fastened to the adapter gear 220, and the output of the motor 110 is directly delivered to the adapter gear 220, thereby the operating loss can be reduced and the operating frictional noise can be minimized.

Referring to FIGS. 10 and 11, the adapter gear 220 is fastened to the pinion gear 300 as the adapter protrusion 222 is inserted into at least part of the plurality of adapter grooves 321. In addition, when an external force is input through the seat, or a great load occurs, the adapter gear 220 and the pinion gear 300 are idle and the external force or the great load is prevented from being delivered to the rotating module 200 or the driving module 100. That is, when an external force or a great load is applied thereto, the adapter protrusion 222 is separated from the adapter groove 321 temporarily, moves along the outer circumferential surface of the adapter portion 320, and is inserted into an adjacent adapter groove 321, thereby preventing the external force or the great load from being delivered to the rotating module 200 or the driving module 100 when the adapter gear 220 and the pinion gear 300 are idle.

At this instance, a quantity of the adapter protrusion 222 provided in the adapter gear 220 is smaller than a quantity of the adapter groove 321 provided in the pinion gear 300, and accordingly, when the external force or the great load is applied to the driving device 10, a slip is generated between the adapter gear 220 and the pinion gear 300. The slip between the adapter gear 220 and the pinion gear 300 means that the rotational force is not transferred between the adapter gear 220 and the pinion gear 300. As a result, when the adapter gear 220 rotates by the external force, or the great load, it is possible to prevent the rotational force from being delivered to the motor 110 through the pinion gear 300, thereby damage to the motor 110 can be prevented.

At this instance, because the pinion end 330 of the pinion gear 300 is inserted into the pinion guide hole 242 of the brake ring 240, the pinion gear 300 can maintain a state of being parallel to the rotational shaft of the clutch 250 when a slip occurs between the pinion gear 300 and the adapter gear 220.

The wheel cover 230 may be coupled to the housing 210 and may accommodate the adapter gear 220 to be rotatable therein.

The wheel cover 230 may be inserted into and coupled to an internal space of the housing 210. The wheel cover 230 may be formed in a shape which corresponds to a shape of the adapter gear 220. Therefore, the adapter gear 220 can be stably accommodated in a space between the wheel cover 230 and the housing 210, and can be stably rotated.

The brake ring 240 is coupled to the housing 210, and an inner circumferential surface thereof is formed to be a circumferential surface. The brake ring 240 may be fixedly coupled to the housing 210. The flange of the housing 210 may have a shape identical to a shape of the brake ring 240.

The brake ring 240 may be disposed to surround the clutch 250 and the brake wedge 260. The brake roller 270 may be disposed between the brake ring 240 and the brake wedge 260. In other words, the clutch 250, the brake wedge 260, and the brake roller 270 may be disposed inside the brake ring 240.

In addition, the brake ring 240 may have the pinion guide portion 241 which supports the pinion gear 300. The pinion guide portion 241 guides an assembly position of the pinion gear 300, and supports the pinion gear 300 so that alignment change of the pinion gear 300 can be prevented when the motor operates. For example, the pinion guide portion 241 may have the pinion guide hole 242 into which the pinion end 330 of the pinion gear 300 is inserted.

With this configuration, the alignment change of the pinion gear 300 is prevented, the alignment change of the adapter gear 220, which rotates together with the pinion gear 300, is prevented, interference between the gear-tooth of the adapter gear 220 and gear-tooth **252*a* of the clutch 250 can be prevented and the rotational force of the motor 110** can be transferred stably.

The clutch 250 may be rotated by receiving a rotational force of the motor 110. In more detail, the clutch 250 may be formed in a hollow circular block shape. One end of the clutch 250 is engaged with the adapter gear 220, and another end thereof is formed to transfer the rotational force to the brake wedge 260.

In the present disclosure, the clutch 250 may be configured with an unlocking part 251 and the gear part 252. The unlocking part 251 and the gear part 252 are formed of each different material, and are coupled to each other so as to form the clutch 250.

Referring to FIG. 8, for example, the unlocking part 251 and the gear part 252 may be provided as a ring shape, a press-fit groove **251*d* and a press-fit protrusion 252*b*** provided in each of them are fitted to and inserted into each other to be coupled.

The gear part 252 is configured to be engaged with the adapter gear 220, and may be formed of a metal material such as steel having relatively higher strength. Gear-tooth **252*a* to be engaged with the adapter gear 220 are formed on an outer circumferential surface of the gear part 252, and a plurality of press-fit protrusions 252*b* protruding inward and spaced apart from each other at an equal interval in a circumferential direction are provided on an inner circumferential surface of the gear part 252**.

The unlocking part 251 is configured to transfer the rotational force to the brake wedge 260, and may be formed of a plastic material or a resin material which has relatively lower strength. By doing so, the unlocking part 251 can absorb vibration and noise when transferring the rotational force to the brake wedge 260 and the brake roller 270, and as a rotational shaft of the brake wedge 260 moves, the unlocking part 251 may transfer the rotational force to the brake wedge 260 smoothly.

For example, the unlocking part 251 may have a coupling portion **251*c* protruding in an axial direction from one surface thereof and inserted into an inside of the gear part 252, and a plurality of unlock protrusions 251*a* protruding in an axial direction from another surface thereof and configured to release a locked state of the brake roller 270**.

The coupling portion **251*c* may have a plurality of press-fit grooves 252*d* having an outer circumferential surface thereof coupled to an inner circumferential surface of the gear part 252 to be come into close contact therewith, and having part of an outer circumferential surface thereof recessed in a shape corresponding to the press-fit protrusion 252*b* along a circumferential direction. In addition, the coupling portion 251*c* may have a plurality of deformable protrusions 251*e* which are part of the outer circumferential surface of the coupling portion 251*c*** protruding and spaced apart from each other at an equal interval in a circumferential direction.

With this configuration, when the unlocking part 251 and the gear part 252 are coupled to each other, the deformable protrusion **251*e* is pressed to the inner circumferential surface of the gear part 252 and deformed, and the press-fit protrusion 252*b* is deformed and inserted into the press-fit groove 251*d*, thereby the unlocking part 251 can be press-fitted and coupled to the gear part 252**.

The unlock protrusion **251*a* is formed to be long from another surface of the unlocking part 251 along a circumference, and the unlock protrusion 251*a* may be provided in plural number to be spaced apart from each other at an equal interval in a circumferential direction. In addition, between the plurality of unlock protrusions 251*a*, a guide protrusion 262 to be described below, a pair of brake rollers 270, and a pair of elastic members 271** are disposed.

Both ends of the unlock protrusion 251*a* in a circumferential direction are disposed to face the brake roller 270, and come into contact with and press the brake roller 270 when the motor 110 operates.

The unlock protrusion 251*a* may have a protruding portion 251*b*. The protruding portion 251*b* comes into contact with the brake roller 270 first when the clutch 250 rotates, and spaces the brake roller 270 apart from an inner circumferential surface of the brake ring 240. In more detail, the protruding portion 251*b* protrudes from a surface pressing the brake roller 270, and is formed to press the brake roller 270 radially inward in a circumferential direction.

Referring to FIG. 13, when the clutch 250 rotates, a moving direction a1 of the unlock protrusion 251*a* is a rotational direction of the clutch 250, and a supporting direction a2 that the protruding portion 251*b* supports the brake roller 270 is headed toward a radially inner side than the moving direction a1 of the unlock protrusion 251*a* is. That is, a point b that the protruding portion 251*b* presses the brake roller 270 is not disposed on a circumferential end surface in the unlock protrusion 251*a*, but on a radial inside surface of the protruding portion 251*b*.

As such, because the protruding portion 251*b* is formed to press the brake roller 270 radially inward when the clutch 250 rotates, thereby certainly spacing the brake roller 270 apart from the brake ring 240, and the restricted state of the brake wedge 260 can be stably released.

The brake wedge 260 is disposed on a radial inside of the brake ring 240, and is disposed between the clutch 250 and the cover plate 280 along an axial direction.

The brake wedge 260 is formed to have a ring shape and has a wedge surface 261 and a guide protrusion 262 on an outer circumferential surface.

The brake wedge 260 has a plurality of wedge surfaces 261 on an outer circumferential surface. Each of the wedge surfaces 261 may form a wedge space between the wedge surface 261 and an inner circumferential surface of the brake ring 240.

The wedge surface 261 is formed with a pair of inclined surfaces, the wedge spaces are formed by both inclined surfaces on both sides in a rotational direction, and because the brake roller 270 is provided on each inclined surface, a rotation of the brake wedge 260 in both rotational directions is impossible.

For example, the wedge surface 261 may be formed of two inclined surfaces 261*a* and 261*b*, of which a height is high at a center and becomes lower toward both directions.

The brake roller 270 is provided on each of the inclined surfaces 261 and 261*b*. When the brake roller 270 moves upward (toward a center of the wedge surfaces 261) along the corresponding inclined surface 261*a* and 261*b*, the brake roller 270 is caught between the brake wedge 260 and the brake ring 240 and the brake wedge 260 is restricted with respect to the brake ring 240 in the both rotational directions. When the brake roller 270 moves downward along the inclined surface 261*a* and 261*b*, the catching state is released, and a rotation of the brake wedge 260 is free.

Meanwhile, the brake wedge 260 may have a plurality of guide protrusions 262 having a radial shape and protruding from an outer circumferential surface. A quantity of the guide protrusion 262 is the same as a quantity of the unlock protrusion 251*a* formed in the clutch 250, and is a half the quantity of the brake roller 270.

The plurality of guide protrusions 262 have a height that is the same from a center of the brake wedge 260 in a radial direction, and are spaced apart from each other at an equal interval along an outer circumferential surface of the brake wedge 260, and an outer end surface of the guide protrusion 262 in a radial direction may be formed in an arch shape having the same curvature as that of the inner circumferential surface of the brake ring 240. Therefore, in a state of coming into contact with the inner circumferential surface of the brake ring 240, the brake wedge 260 may be slidably rotated stably.

At this instance, the brake wedge 260 is disposed to be capable of moving in a radial direction between a space formed between a spacer 290 and the clutch 250. That is, the rotational shaft of the brake wedge 260 is disposed to be movable without being restricted in one place. The rotational shaft of the brake wedge 260 may not correspond with the rotational shaft of the clutch 250, and moving is made possible depending on a rotating state. For example, a gap may be formed between the brake wedge 260 and the inner circumferential surface of the brake ring 240, or as the guide protrusion 262 is deformed, the brake wedge 260 may move in a horizontal direction on an inner side of the brake ring 240.

Therefore, the brake wedge 260 does not need a guide to align the rotational shaft thereof to a center shaft of the clutch 250, therefore, there are effects that the power loss due to friction can be reduced and the operating sensitivity can be improved as a result.

With this configuration, when the driving module 100 operates, the rotating frame 30 rotates about a rotational shaft on an upper side of the fixed frame 20, and the rotational shaft of the rotating frame 30 may move.

Meanwhile, between the guide protrusions 262 in an assembled state, the unlock protrusion 251*a* and the pair of brake rollers 270 are disposed.

Installing grooves 262*a* are formed on both radial side surfaces of the guide protrusion 262, and an elastic member 271 may be inserted into and seated on the installing groove 262*a*. Part of a body of the elastic member 271 protrudes toward an outside of the installing groove 262*a* in an uncompressed state, and may contact and support the brake roller 270.

Meanwhile, an output member 263 may be provided on the brake wedge 260. The output member 263 is coupled to the rotating frame 30 and transfers the rotational force of the brake wedge 260 to the rotating frame 30.

With this configuration, a rotation of the brake wedge 260 may rotate the rotating frame 30 and a cushion frame of the seat through the output member 263.

The brake roller 270 is installed between the wedge surface 261 of the brake wedge 260 and the inner circumferential surface of the brake ring 240.

The brake roller 270 is provided as a pair on each wedge surface 261. That is, the brake roller 270 is disposed one in number on each inclined surface of the wedge surface 261. In addition, the unlock protrusion 251*a* is provided between the pair of brake rollers 270.

The elastic member 271 presses the brake roller 270 in a wedge gap direction so that the brake roller 270 is caught in the wedge gap, thereby a rotation of the brake roller 260 is restricted with respect to the brake ring 240.

As a material of the elastic member 271, the elastomer which is a plastic having an elasticity like a rubber and excellent formability may be used.

After the brake roller 270 and the elastic member 271 are installed, the cover plate 280 is mounted through a coupling member such as a screw etc. to the flange of the housing 210. The cover plate 280 is an approximately circular flat plate, and its outer circumferential surface may have a shape corresponding to the flange of the housing 210.

The cover plate 280 is coupled to the housing 210 and may accommodate the adapter gear 220, the wheel cover 230, the clutch 250, the brake wedge 260, and the brake roller 270 on the inside.

At a center of the cover plate 280, a hole may be formed. Through the hole formed at the center of the cover plate 280, the output member 263 may be exposed. The exposed output member 263 may be coupled to the rotating frame 30 and transfer the rotational force of the brake wedge 260. The rotating frame 30 is coupled to the rotating frame on which the cushion frame of the seat is mounted.

The cover plate 280 may have a complementary guide portion 281 to prevent the alignment change of the pinion gear 300. The complementary guide portion 281 is one protruding side of the outer circumferential surface of the cover plate 280, and at a position facing the pinion guide hole 242, the complementary guide hole 282 may be formed. Part of the pinion end 330 of the pinion gear 300 may be inserted into the complementary guide hole 282, and the complementary guide portion 281 supports one side of the pinion gear 300, thus, supports a position of the pinion gear 300.

With this configuration, the pinion gear 300 passes through the pinion through hole 213 and the adapter portion is fastened to the adapter gear 220, and the pinion end 330 passes through the wheel cover 230 and is inserted into the pinion guide hole 242 and the complementary guide hole 282, to be supported thereon.

Meanwhile, a spacer 105 may be further disposed between the brake wedge 260 and the cover plate 280. The spacer 105 covers the brake wedge 260, and prevents damage between the cover plate 280 and the brake wedge 260.

Hereinafter, the operation of the driving device of the power swivel seat according to the present disclosure will be described.

Usually, the brake roller 270 is pushed toward the wedge space by the elastic member 271, and as the brake roller 270 is caught between the wedge surface 261 of the brake wedge 260 and the inner circumferential surface of the brake ring 240, the brake wedge 260 gets into a locked state in which the rotation of the brake wedge 260 with respect to the brake ring 240 is impossible. Because the brake ring 240 is fixed to the housing 210, the brake wedge 260 is fixed as well.

The brake rollers 270 restrict the brake wedge 260 on both inclined surfaces 261*a* and 261*b* of the wedge surface 261, the rotation of the brake wedge 260 is restricted in both rotational directions.

In addition, as described above, the brake roller 270 is caught between the brake ring 240 and the brake wedge 260 without a gap, and restricts the rotation of the brake wedge 260, therefore, a movement in the rotational direction may not occur in the brake wedge 260.

In addition, as the rotating frame 30 coupled to the brake wedge 260 is restricted and the rotation thereof is impossible, the movement in the rotational direction of the seat can be apparently prevented.

Meanwhile, when the motor 110 operates as the driver manipulates the switch, the pinion gear 300 rotates, and the adapter gear 220 fixed to the pinion gear 300 rotates. In addition, the clutch 250 engaged with the adapter gear 220 rotates. At this instance, as the pinion gear 300 is not engaged with the adapter gear 220 and is inserted into and fixed to the insertion hole 221 formed in the adapter gear 220, it is possible to prevent the power loss due to gear coupling, and an adapter structure between the adapter gear 220 and the pinion gear 300 can be provided.

Meanwhile, according to the rotation of the clutch 250, the unlock protrusion 251*a* contacts the brake roller 270 on one side and pushes the brake roller 270.

Accordingly, as the brake roller 270 moved by the unlock protrusion 251*a* moves in a direction opposite to the wedge space (a lower side of the inclined surface 261*b*), and a gap is formed between the brake roller 270 and the wedge surface 261, the restricted state of the brake wedge 260 is released.

At this instance, the brake roller 270 moved by the unlock protrusion 251*a* moves while compressing the elastic member 271, and comes into contact with the guide protrusion 262. That is, in a state in which the unlock protrusion 251*a*, the brake roller 270, and the guide protrusion 262 come into close contact with each other, as the unlock protrusion 251*a* pushes the brake roller 270 and the guide protrusion 262 continuously according to a rotation of the clutch 250, the brake wedge 260 continues to be rotated.

At this instance, the brake roller 270 which is not directly moved by the unlock protrusion 251*a* moves in a direction opposite to the wedge gap (a lower side of the inclined surface 261*a*) by the rotation of the brake wedge 260, the restricted state is released, and the rotation of the brake wedge 260 cannot be restricted. Therefore, the rotation of the brake wedge 260 as the above is possible.

When the brake wedge 260 is rotated as the above, the rotating frame 30 of the seat swivel device coupled thereto is rotated by the output member 263, and the seat is rotated in a direction selected by the passenger.

After the seat is rotated in a desired direction, when the passenger stops manipulation of the switch, the rotation of the clutch 250 stops as the power supply to the motor 110 is stopped.

Therefore, because the unlock protrusion 251*a* cannot push the brake roller 270 any longer, and the brake roller 270 returns to its original position by the restoring force of the elastic member 271, the brake wedge 260 is restricted by the brake ring 240 again and the rotation thereof in both directions is made impossible, thereby the seat is fixed therein.

The present disclosure has been described in detail with reference to the exemplary embodiments, but the exemplary embodiments are illustrative and the present disclosure is not limited thereto. It is apparent that those skilled in the art may modify or improve the exemplary embodiments within the technical spirit of the present disclosure.

All of the simple modifications or changes of the present disclosure belong to the scope of the present disclosure, and the specific scope of the present disclosure may be apparent by the accompanying claims.

REFERENCE NUMERALS

10: driving device
100: driving module
110: motor
200: rotating module
210: housing
220: adapter gear
221: insertion hole
222: adapter protrusion
230: wheel cover
240: brake ring
241: pinion guide portion
242: pinion guide hole
250: clutch
251: unlocking part

251*a*: unlock protrusion
251*b*: protruding portion
251*c*: coupling portion
251*d*: press-fit groove
251*e*: deformable protrusion
252: gear part
252*a*: gear tooth
252*b*: press-fit protrusion
260: brake wedge
270: brake roller
280: cover plate
281: complementary guide portion
282: complementary guide hole
290: spacer
300: pinion gear
310: pinion body
320: adapter
321: adapter groove
330: pinion end

What is claimed is:

1. A driving device of a power swivel seat, comprising:

a housing mounted to a side of a floor panel and allowing a brake ring to be coupled thereto;

a pinion gear connected to a rotational shaft of a motor and configured to receive a rotational force when the motor operates;

an adapter gear coupled to the pinion gear and configured to rotate together with the pinion gear;

a clutch installed to be rotatable on an inside of the brake ring and tooth-engaged with the adapter gear;

a brake wedge installed to be rotatable on an inside of the brake ring and configured to be rotated by the clutch;

a plurality of brake rollers installed between the brake wedge and the brake ring and configured to restrict or release a rotation of the brake wedge with respect to the brake ring;

a cover plate coupled to the housing with the brake ring interposed therebetween; and a spacer disposed between the cover plate and the brake wedge and supporting the brake wedge toward the clutch, wherein the brake wedge is disposed to be movable in a radial direction between the spacer and the clutch.

2. The driving device of claim 1, further comprising:

a fixed frame fixed to the housing and the floor panel; and a rotating frame fixed to the brake wedge and the seat, wherein the rotating frame is rotatably installed on the fixed frame such that a rotational shaft of the rotating frame is movable.

3. The driving device of claim 1, wherein the brake ring has a pinion guide hole formed to allow an end of the pinion gear to be inserted thereinto.

4. The driving device of claim 1, wherein the clutch has at least one unlock protrusion protruding from one surface and configured to press the brake roller in a circumferential direction, and wherein the unlock protrusion has a protruding portion protruding from a surface pressing the brake roller and configured to press the brake roller in a circumferential direction toward a radial inside.

5. A driving device of a power swivel seat, comprising:

a driving module including a motor; and a rotating module installed between a floor panel and a seat, wherein the rotating module comprises:

a housing a housing mounted on a side of a floor panel and allowing a brake ring to be coupled thereto;

a clutch installed to be rotatable on an inside of the brake ring;

an adapter gear configured to be rotated by the driving module and tooth-engaged with the clutch to rotate the clutch;

a brake wedge installed to be rotatable on an inside of the brake ring and configured to be rotated by the clutch; and a plurality of brake rollers installed between the brake wedge and the brake ring and configured to restrict or release a rotation of the brake wedge with respect to the brake ring, wherein the driving module comprises:

a pinion gear connected to a rotational shaft of a motor and configured to receive a rotational force when the motor rotates and to transfer a rotational force to the rotating module, and wherein the pinion gear is fixed to the adapter gear and at least a portion thereof is inserted into a pinion guide hole formed on the brake ring.

6. The driving device of claim 5, wherein the adapter gear has an insertion hole allowing the pinion gear to be inserted thereinto, wherein the pinion gear comprises:

an adapter portion inserted into the insertion hole and having a plurality of adapter grooves spaced apart from each other at an equal interval on an outer circumferential surface along a circumferential direction, and wherein the adapter gear further comprises:

an adapter protrusion protruding from an inner circumferential surface of the insertion hole and formed to be inserted to one among the plurality of adapter grooves.

7. The driving device of claim 5, wherein the pinion gear comprises:

a pinon body fixed to the driving module;

an adapter portion penetrating the housing and fastened to the adapter gear; and a pinion end inserted into the pinion guide hole.

* * * * *